July 24, 1934.  H. W. BEEDLE  1,967,802
CHARGING SYSTEM FOR STORAGE BATTERIES
Filed March 23, 1933
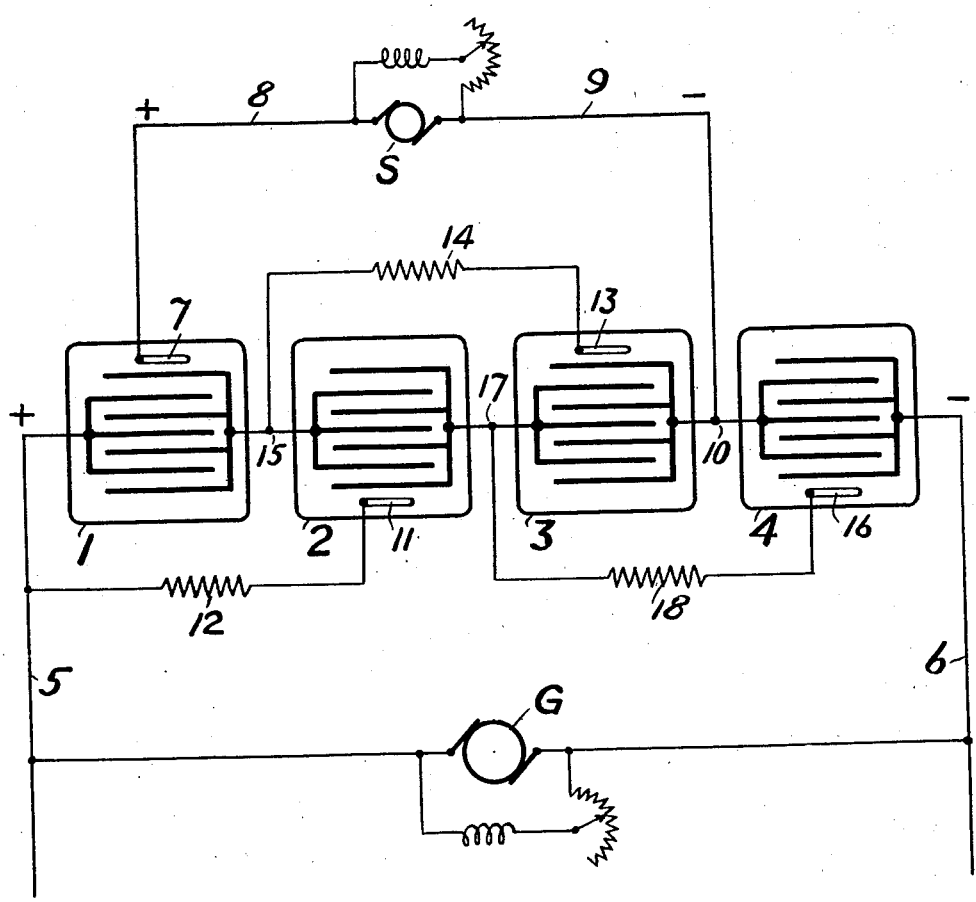
WITNESS:
INVENTOR
Harry W. Beedle
BY
Augustus B Stoughton,
ATTORNEY.

Patented July 24, 1934

1,967,802

UNITED STATES PATENT OFFICE 1,967,802

CHARGING SYSTEM FOR STORAGE BATTERIES

Harry W. Beedle, Boston, Mass., assignor to The Electric Storage Battery Company, Philadelphia, Pa., a corporation of New Jersey Application March 23, 1933, Serial No. 662,224

4 Claims. (Cl. 171—314)

It is customary in many commercial applications of storage batteries to connect the battery continuously across a constant voltage, direct current circuit, adjusting the voltage of the circuit to give the battery continuously a low rate (so called, trickle) charge just sufficient to compensate for local action in the cells and maintain the battery in a fully charged condition. The amount of trickle charge current required to keep the negative plates in a fully charged condition is usually somewhat greater than that required by the positive plates. It is therefore necessary in order to avoid gradual discharge of the negatives to subject the cells to a higher rate of trickle charge current than would be required by the positives, thus subjecting the positives to an appreciable amount of overcharge which has a tendency to shorten the life of the plate. In order to maintain this higher rate of trickle charge, it is necessary to maintain across the cells a somewhat higher floating voltage than would be necessary if the trickle charge could be reduced to the current required for the positives.

An object of this invention is to supply to the negative plates in a series of storage battery cells the amount of trickle charge current required to compensate for local action and keep the negatives fully charged without passing this entire trickle charge current through the positive plates, the positive plates being subject only to the amount of trickle charge current they require. To accomplish this result, an auxiliary electrode is located in each cell connected to a point in the series of cells of higher positive potential, thus passing charging current into the negative plates in excess of that passing through the positives and then diverting a similar amount of charging current from a point in the circuit between the cell in question and the next cell in the negative direction to prevent this additional current from passing through the positive plates in the next cell. This diverted current is passed into the auxiliary electrode of the second cell in the negative direction from the one first mentioned in order to provide additional charging current to the negative plates in that cell.

The invention will be more clearly understood by reference to the accompanying drawing showing diagrammatically the arrangement of a circuit involving the invention applied to four cells of a storage battery.

In the drawing four storage battery cells numbered respectively 1, 2, 3 and 4 are connected in series across the direct current supply circuit 5, 6, to which is connected any suitable source of direct current, such as the shunt wound generator G. Without the auxiliary circuits of this invention to be described below, the voltage of the generator G will be adjusted to pass through the cells a sufficient amount of trickle charge current to keep the positive plates fully charged, this current as stated above being insufficient to keep the negatives in a fully charged condition. In order to supply the additional current required by the negatives, an auxiliary electrode is immersed in the electrolyte of each cell connected to the auxiliary circuits now to be described.

In cell 1 the auxiliary electrode is shown at 7 and direct current is supplied to this electrode by means of the auxiliary charging source S, here shown as a shunt wound generator connected at its positive terminal by conductor 8 to the electrode 7 and at its negative terminal by conductor 9 to the junction point 10 between the last two cells at the negative end of the battery. The current supplied to electrode 7 should be sufficient to supplement the charging current passing through the positive plates in order to furnish sufficient trickle charge current to the negatives in cell 1 to keep them in a fully charged condition.

The auxiliary electrode 11 in cell 2 is connected to the positive conductor 5 through a fixed resistance 12, the value of this resistance being such as to supply to the electrode 11 the necessary trickle charge current to supplement the trickle charge current passing through the positive plates by an amount necessary to keep the negative plates in cell 2 in a fully charged condition. Similarly auxiliary electrode 13 in cell 3 is connected through resistance 14 to the junction point 15 in the circuit between cell 1 and cell 2, the value of resistance 14 being such as to supply the necessary current to electrode 13 to supplement the charging current passing through the positives in cell 3 so as to provide sufficient trickle charge current to the negatives in cell 3 to keep them in a fully charged condition. It will be noted that the current diverted through resistance 14 will be substantially the same as the current supplied to the auxiliary electrode 7, so that the total charging current passing through the negative plates in cell 1 is reduced by the amount of current diverted through resistance 14 and only the current required by the positive plates in cell 2 is allowed to pass through them. In the same manner auxiliary electrode 16 in cell 4 is connected to the junction point 17 between cell 2 and cell 3 through a fixed resistance 18 of suitable value to permit the necessary excess current to pass from electrode 16 through the negative plates in cell 4 to keep them in a fully charged condition.

It will be noted that the excess current passing through the negative plates in cell 3 is diverted from the junction point 10 between cells 3 and 4 and passes via conductor 9 through the charging source S and is delivered via conductor 8 to the auxiliary electrode 7 in cell 1, thus preventing the excess current passing through the negative plates in cell 3 from passing also through the positive plates in cell 4.

From the above description it will be noted that a system is provided by which the positive plates in a series of cells are furnished with just enough trickle charge current to keep them in a fully charged condition, and by means of an auxiliary electrode in each cell the negative plates are furnished with enough additional current to keep them in a fully charged condition. To furnish this additional current the auxiliary electrode in each cell must be maintained at a somewhat higher potential than the positive plates in that cell, and this is accomplished by connecting this auxiliary electrode to a point in the series of cells having a higher potential, this point being preferably chosen at the junction between the next two cells toward the positive end of the battery with a suitable resistance included in the circuit to control the current at the proper value. The auxiliary electrode in the first cell at the positive end of the battery is maintained at a higher potential than the positive plates in that cell by means of an auxiliary source of current and the excess current which is passed through the negative plates in the next to the last cell at the negative end of the series is diverted from the positive plates in the last cell, preferably by taking this current through the auxiliary source of current which supplies the auxiliary electrode in the first cell.

While the invention has been described as designed for maintaining trickle charge currents through the cells of a storage battery, differing in value for the positive and negative plates respectively, the invention can also be applied for giving a prolonged charge of appreciable amount to the negative plates without passing this excessive charging current through the positives. This application is of special use where new negative plates are installed in cells with old positives, in which case the negative plates will require a prolonged initial charge while the positives will not require this charge. Such a charge can be given to the negative plates while the battery is connected across the direct current circuit without appreciably increasing the voltage maintained across the battery whereas if the initial charge is given to both positives and negatives as has been customary up to the present time, the voltage of the main direct current circuit must be increased to an abnormal value, endangering translation devices which may be connected to the circuit.

I claim:

1. In a storage battery charging system comprising a series of storage cells connected across a source of direct current, means for supplying charging current to the negative plates in the cells in excess of that supplied to the positive plates, said means including auxiliary electrodes in the cells, each of said electrodes except that in the first cell at the positive end being connected to a point in the series having a higher potential than that of the positive plates in the same cell, means for supplying current to the auxiliary electrode in the first cell at the positive end, and means for diverting from the positive plates of each cell except the first the excess current supplied to the negative plates in the next cell on the positive side.

2. In a storage battery charging system comprising a series of storage cells connected across a source of direct current, means for supplying charging current to the negative plates in each cell in excess of that supplied to the positive plates, said means comprising an auxiliary electrode in each cell, a circuit including a controlling resistor connecting the auxiliary electrode in each cell, except the first cell at the positive end, with the positive terminal of the next cell on the positive side, and an auxiliary charging source connected between the auxiliary electrode in the first cell and a point in the series of cells between the last two cells at the negative end.

3. A storage battery charging circuit for continuously charging a storage battery at a low rate for compensating for local action in the plates of the battery, said circuit comprising in combination, a source of direct current, a plurality of storage battery cells connected in series across said source, auxiliary electrodes in each of said cells, means independent of said source and connected to the auxiliary electrode of the cell connected to the positive side of said source and connected to the positive plates of the cell connected to the negative side of said source, said means being adapted to supply current to said auxiliary electrode at a higher potential than the positive plates in the cell connected to the positive side of said source, and connections each between one of the remaining auxiliary electrodes and the positive plates of the cell next on the positive side of the cell containing such electrode.

4. A system for charging a storage battery comprising, a series of storage cells having positive and negative plates, a charging source connected to said series of cells, means for supplying current to the negative plates of an intermediate cell in excess of that supplied to the positive plates of that cell said means comprising an auxiliary electrode in said cell connected to a source of potential higher than that of the positive plates in said cell, and means for diverting said excess current from the positive plates in the next cell toward the negative end of the series.

HARRY W. BEEDLE.